US008115608B2

(12) United States Patent
Davis et al.

(10) Patent No.: US 8,115,608 B2
(45) Date of Patent: Feb. 14, 2012

(54) METHOD AND APPARATUS FOR PROVIDING A HAZARDOUS MATERIAL ALERT

(75) Inventors: Steven J. Davis, Escondido, CA (US); John Harvey, San Diego, CA (US); Lynne Patrick, San Diego, CA (US); Scott Rusnak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 10/663,405

(22) Filed: Sep. 16, 2003

(65) Prior Publication Data

US 2005/0057344 A1 Mar. 17, 2005

(51) Int. Cl.
*B60Q 1/00* (2006.01)

(52) U.S. Cl. ................................ 340/425.5; 340/539.26

(58) Field of Classification Search ............... 340/425.5, 340/471, 988, 539.26

See application file for complete search history.

(56) References Cited

U.S. PATENT DOCUMENTS

| | | | | |
|---|---|---|---|---|
| 5,008,661 | A | 4/1991 | Raj | |
| 5,347,274 | A * | 9/1994 | Hassett | 340/988 |
| 6,472,771 | B1 * | 10/2002 | Frese et al. | 307/10.1 |
| 6,580,367 | B2 * | 6/2003 | Roach | 340/471 |
| 2002/0084918 | A1 * | 7/2002 | Roach | 340/988 |

FOREIGN PATENT DOCUMENTS

| | | |
|---|---|---|
| FR | 2637712 | 10/1988 |
| WO | 9407225 | 3/1994 |

OTHER PUBLICATIONS

International Search Report and Written Opinion—PCT/US2004/029526, International Authority Search Authority—European Patent Office—Mar. 21, 2005.

* cited by examiner

*Primary Examiner* — Travis R Hunnings
(74) *Attorney, Agent, or Firm* — Gerald P. Joyce, III

(57) ABSTRACT

System for providing a hazardous materials hazardous material alert. The system includes a method for transmitting a hazardous material alert for use with a vehicle that is transporting hazardous material. The method comprises steps of detecting a hazard event, and transmitting the hazardous material alert in response to the hazard event, wherein the hazardous material alert includes information relating to the hazardous material.

16 Claims, 4 Drawing Sheets

METHOD AND APPARATUS FOR PROVIDING A HAZARDOUS MATERIAL ALERT

BACKGROUND

I. Field

The present invention relates generally to transportation and delivery systems, and more particularly, to a method and apparatus for providing a hazardous materials alert for use with a vehicle transporting hazardous materials.

II. Description of the Related Art

Advances in technology have provided for increased automation in many industries. For example, in the trucking industry, technology has allowed for the shipment and delivery of cargo virtually around the clock. Vehicles now carry and deliver cargo to all parts of the country. For example, cargo-carrying tractor-trailers may be driven hundreds or thousands of miles to reach a delivery site.

Typically, cargo is loaded into a trailer portion of a tractor-trailer vehicle and driven from point to point along a delivery route by a vehicle operator. Along the delivery route, intermediate stops may occur where portions of the cargo are unloaded for delivery or where new cargo is picked up. To facilitate efficient routing, sometimes a trailer is detached from its current tractor and left at a designated location for pickup by another tractor. The trailer may sit at this intermediate location for various lengths of time while waiting to be retrieved by another tractor. This detachable trailer arrangement allows shippers to plan the most efficient and cost effective routes for the delivery of the cargo. In some cases, the trailer acts as a storage container to store the cargo for an extended period of time.

Generally speaking, the vast majority of cargo carried by the trucking industry represents food or other consumer goods that do not pose a danger to the public during transportation. However, the trucking industry also transports hazardous materials (HAZMAT) that may pose a threat to the general public or the environment. For example, materials such as fuels, chemicals, oil, waste materials, or other hazardous materials may pose a serious risk to the public in the event of a vehicle accident or malfunction. For example, if a truck carrying a cargo of dangerous chemicals is involved in an accident, leakage of the chemicals may endanger lives or pose a serious risk to the local environment. Therefore, it is very important that emergency and rescue personnel receive notice of such accidents in a timely fashion. It is also important that rescue personnel are provided with enough information to understand the dangers of such chemicals and any other information necessary to contain the spill and treat affected persons and the environment.

Currently, vehicles transporting hazardous materials use a placard that is placed on the vehicle to indicate the type of hazardous cargo being transported. However, if the vehicle is involved in an accident, the placard may not be visible to emergency personnel. Also, a simple placard may not provide enough information about the cargo to inform rescuers about necessary treatment procedures. It is also possible that the wrong placard may be placed on the vehicle, thereby further compounding the problem. Furthermore, a simple placard does not provide any notification that an accident may have occurred or help to locate the vehicle in case of an emergency.

Therefore, what is needed is a system for use by a vehicle transporting hazardous material to alert rescue and emergency personnel, in the event of an accident, vehicle malfunction, or other event, to the dangers of the hazardous material onboard. Ideally, first responders to an accident or vehicle malfunction are notified of the type of cargo being transported and information on how to treat injured persons and/or minimize contamination from the hazardous material.

SUMMARY

In one or more embodiments, a hazard detection system comprises methods and apparatus hazardous material alert for use with a vehicle transporting hazardous materials. In one embodiment, the system includes means, such as vehicle sensors, for detecting a hazard event. The hazard event is defined as any event where the hazardous cargo is a potential danger to people or the environment. For example, the hazard event may be based on a vehicle accident, condition of the cargo, an operator command, or a message received from a remote location. In response to the hazard event, the system operates to transmit a hazardous material alert hazardous material alert that contains a variety of information relating to the hazardous cargo. The hazardous material alert provides several functions. First, it provides notification that a hazard event has occurred. Second, it provides information to emergency personnel about the hazardous cargo and treatment procedures. Third, it may optionally provide vehicle location information so that the vehicle can be immediately located in the event of an accident. Furthermore, because the hazardous material alert is a transmitted signal, emergency personnel can receive the information while they are still at a safe distance from the vehicle.

In one embodiment, the hazard detection system operates to control one or more vehicle systems in response to the detected hazard event. For example, the system may control the vehicles ignition system or cargo door locks in response to a detected hazard event.

In another embodiment, a method is provided for transmitting a hazardous material alert for use with a vehicle that is transporting hazardous material. The method comprises detecting a hazard event, and transmitting the hazardous material alert in response to the hazard event, wherein the hazardous material alert includes information relating to the hazardous material.

In another embodiment, an apparatus is provided for transmitting a hazardous material alert for use with a vehicle that is transporting hazardous material. The apparatus comprises means for detecting a hazard event, and means for transmitting the hazardous material alert in response to the hazard event, wherein the hazardous material alert includes information relating to the hazardous material.

In yet another embodiment, an apparatus for transmitting a hazardous material alert for use with a vehicle that is transporting hazardous material is provided. The apparatus comprises detection logic that operates to detect a hazard event, and transmission logic coupled to the detection logic, the transmission logic operates to transmit the hazardous material alert in response to hazard event, wherein the hazardous material alert includes information relating to the hazardous material.

In yet still another embodiment, a computer-readable media is provided that comprises instructions for execution by a hazard detection system that is used with a vehicle transporting hazardous material. The instructions, when executed by the hazard detection system, cause a hazardous material alert to be transmitted. The computer-readable media comprises instructions for detecting a hazard event, and instructions for transmitting the hazardous material alert in response to the hazard event, wherein the hazardous material alert includes information relating to the hazardous material.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a hazard detection system, including methods and apparatus for providing an hazardous material alert for use with a vehicle that is transporting hazardous material. The vehicle includes communication logic that allows the detection system to wirelessly transmit information about the vehicle's status and/or hazardous cargo. It should be understood that the described detection system could also be used in conjunction with virtually any type of vehicle including, but not limited to, trucks, buses, trains, aircraft, automobiles, and watercraft.

Figure 1:
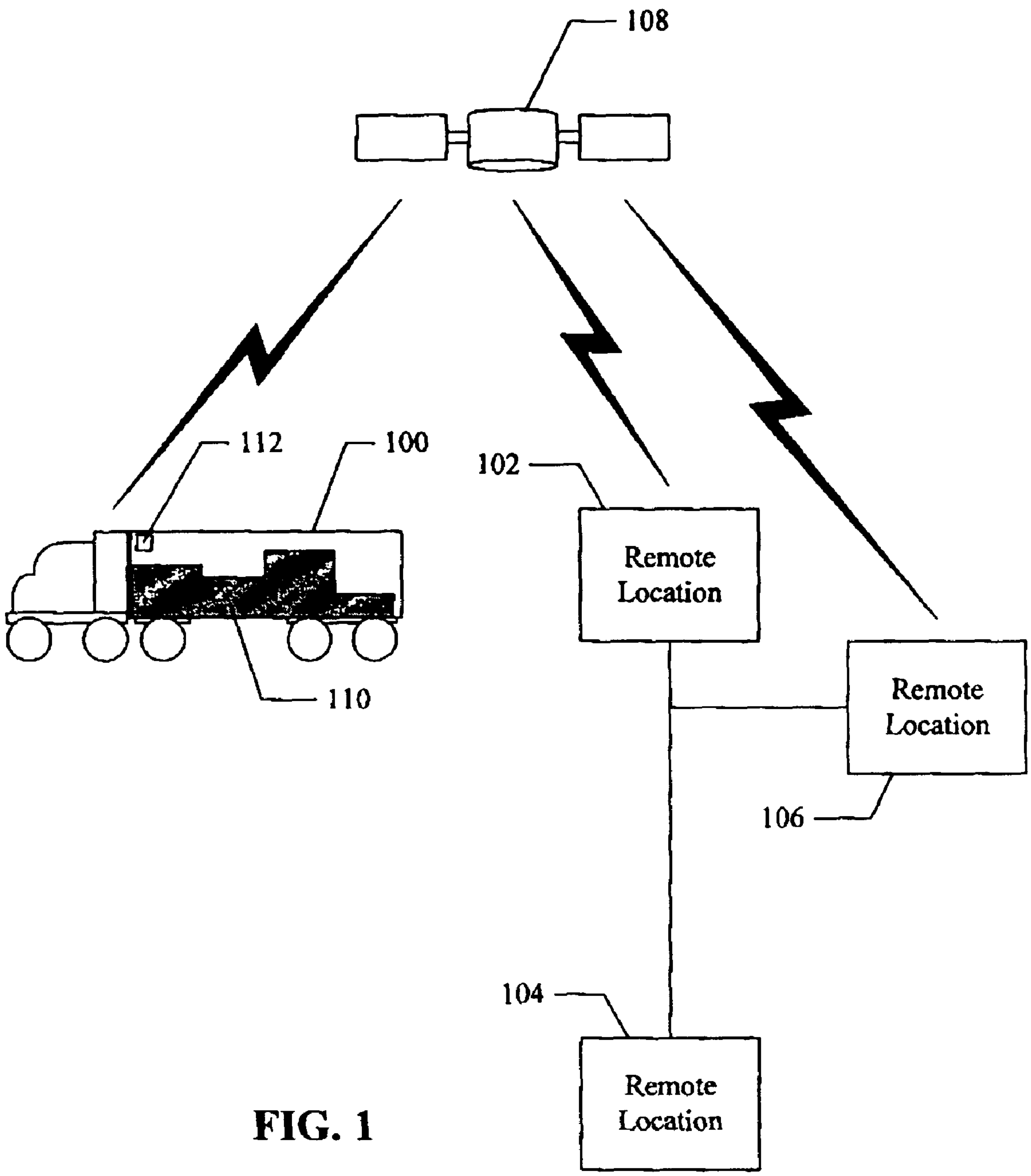
FIG. 1 shows a vehicle that includes one embodiment of a hazard detection system for detecting a hazard event associated with a vehicle.

FIG. 1 shows a vehicle 100 that includes one embodiment of a hazard detection system 112. The vehicle 100 in this example comprises a tractor-trailer, commonly used in the long-haul trucking industry to transport goods from shippers to consignees. The vehicle 100 comprises a mobile communication terminal (MCT, not shown) for communicating with one or more remote locations using, in this embodiment, a satellite-based wireless communication system. Other types of wireless communication systems could be used in the alternative, or in addition to, the satellite communication system, such as a terrestrial cellular communication system, a wireless packet data communication system, radio frequency communication system (e.g., FM, AM, LMR systems), and so on. The satellite communication system provides two-way communications between vehicle 100 and third parties, such as a fleet management center or dispatch center, family members, governmental authorities, consignees, shippers, and so on. Generally, the MCT resides onboard a tractor portion of the vehicle 100 so as to be easily accessible by the vehicle operator, although the MCT could be located anywhere on vehicle 100.

The trailer portion of the vehicle 100 includes hazardous detection system 112 for detecting a hazard event and for broadcasting a hazardous material alert when a hazard event is detected. A hazardous material alert generally comprises a wireless transmission that contains information relating to any hazardous material being transported by vehicle 100, shown in FIG. 1 as hazardous cargo 110. In one embodiment, the hazardous material alert is broadcast locally, having a relatively short range of, for example, 1000 feet. In another embodiment, the hazardous material alert is transmitted over the satellite-based communication system, either through the MCT, or by using a dedicated transmitter to hazardous detection system 112.

In one embodiment, remote location 102 comprises a central processing center, otherwise known as a central station, hub, or network management center (NMC), and serves as a central communication point between MCT-equipped vehicles and their respective dispatch centers, other designated office(s), shippers, consignees, governmental authorities, family members, and so on. For example, remote location 102 passes communications between remote location 104 and vehicle 100. In this embodiment, remote location 104 comprises a vehicle dispatch center that generally monitors and controls a fleet of vehicles similar to vehicle 100.

Communications between remote location 104 and vehicle 100 may further be passed to one or more other remote locations, such as remote location 106. Remote location 106 comprises one of any number of interested third parties that are interested in communications between remote location 104 and vehicle 100. For example, remote location 106 could be another designated office of remote location 104, a shipper of goods being carried by vehicle 100, a consignee of goods being carried by vehicle 100, a governmental unit, an individual, and so on. Communications among remote locations 102, 104, and 106 may be carried out by any known communication techniques, including telephone, Internet, dedicated lines, wireless links, and so on.

The MCT located on vehicle 100 transmits and receives communications wirelessly using, in one embodiment, a satellite-based wireless communication system to communicate with remote location 102. Other wireless systems could be used in addition or in the alternative, such as an analog or a digital cellular telephone system, an RF communication system, or a wireless data communication network, such as a cellular digital packet data (CDPD) network. In other embodiments, the MCT may communicate directly with interested parties, such as remote locations 104, and 106, without communicating through remote location 102. Thus, it is possible for information determined by the detection system 112 to be transmitted to one or more entities associated with the satellite-based wireless communication system.

The detection system 112 is shown in FIG. 1 as being located in a trailer portion of the vehicle, however, the detection system 112 may alternatively be located in a tractor portion of the vehicle. In one embodiment, the detection system 112 has a communication link that connects it to an on-board MCT to allow communication between the detection system 112 and central station 102 via the MCT.

The detection system 112 also comprises connections to one or more vehicle systems and/or vehicle sensors. For example, the detection system 112 may have connections to vehicle systems, such as lights, horns, alarms, ignition or other engine systems, and/or cargo mechanisms, such as door locks, fire control systems, heating or cooling systems, environmental detectors (e.g., a Geiger counter, a temperature sensor, a smoke detector, a pressure sensor), or other cargo related systems. The detection system 112 may also have connections to various vehicle sensors, such as engine sensors, accelerometers, temperature sensors, speed sensors, position sensors (i.e., GPS system), roll-over sensors. The detection system 112 uses the information from these sensors to determine if a hazard event has occurred, i.e., whether the hazardous cargo 110 poses a health or environmental threat.

The detection system 112 also comprises a local transmitter that operates to transmit an hazardous material alert to provide information about the vehicle and its hazardous cargo to emergency personnel. For example, the hazardous material alert may be transmitted via an AM or FM carrier signal, or using citizen-band (CB), short-wave, or other emergency broadcast channels. In one embodiment, the hazardous material alert is transmitted only a short distance, for example, the hazardous material alert may be transmitted less than 1000 yards. In another embodiment, the hazardous material alert may be transmitted hundreds of miles. For example, if the detection system 112 is used aboard a sea-going vessel that is transporting hazardous materials, the detection system may include a high-powered transmitter to transmit the hazardous material alert over extremely long distances.

The hazardous material alert may be received by emergency and rescue personnel to allow such responders to determine the vehicle's location, type of hazardous cargo, status of the cargo, containment and/or treatment procedures, or any other information concerning the vehicle or the hazardous cargo.

Figure 2:
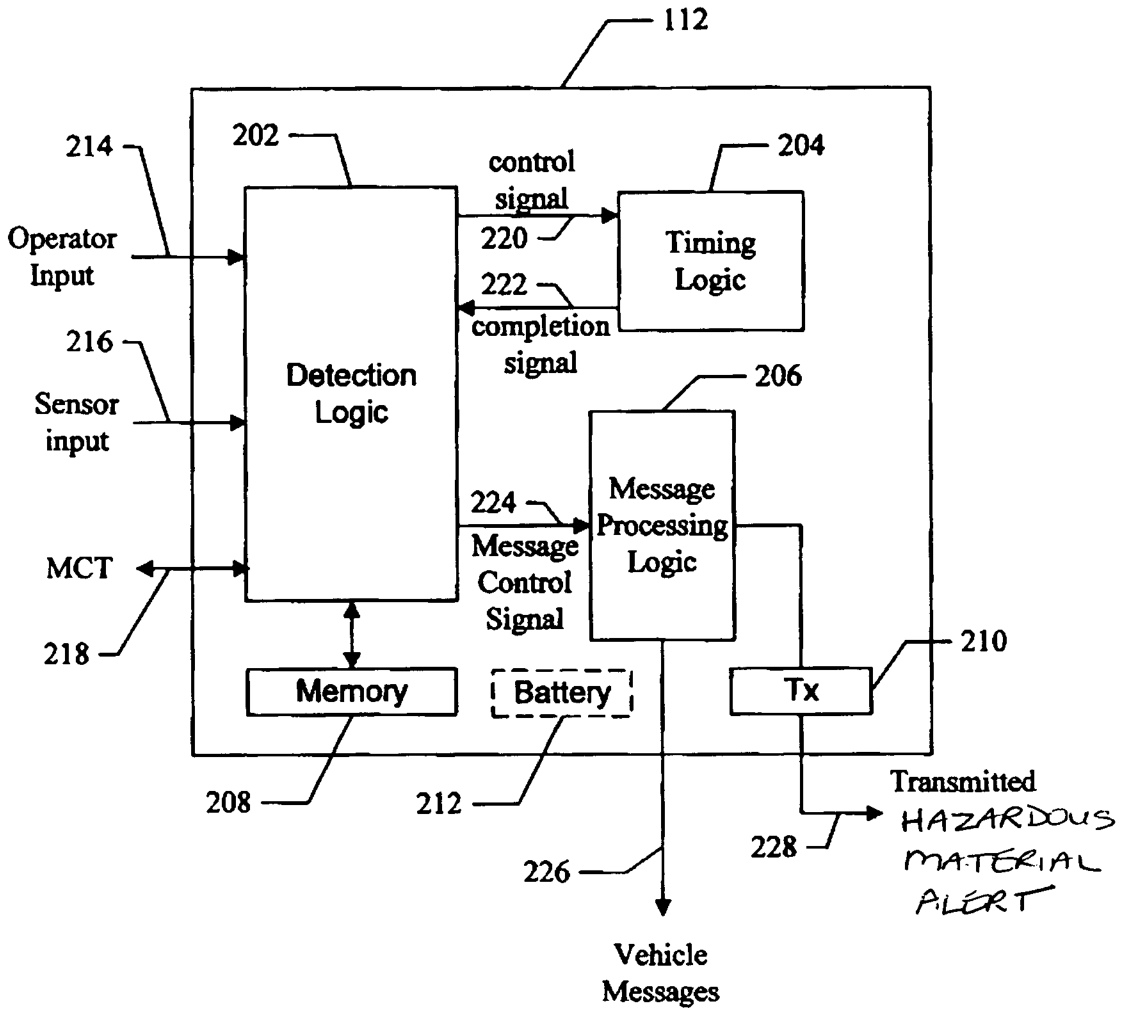
FIG. 2 shows a detailed functional diagram of one embodiment of the detection system of FIG. 1.

FIG. 2 shows a detailed functional diagram of one embodiment of the detection system 112. The detection system 112 comprises detection logic 202, timing logic 204, message processing logic 206, transmitter 210, and memory 208. The detection system 112 may also comprise an optional battery 212. The battery 212 and transmitter 210 allow the detection system 112 to operate in a stand-alone mode (i.e., without vehicle power) to provide an hazardous material alert to local rescue personnel in case of a vehicle accident or malfunction. For example, in one embodiment, the detection system 112 is located in a detached trailer portion of a vehicle. In this embodiment, the detection system 112 continues to operate by supplying it own power and communication transmitter. Thus, it is possible for the detection system 112 to detect a hazard event and provide an hazardous material alert as described herein.

It should be understood that the elements shown in FIG. 2 are for illustrative purposes only, and that implementation of the detection system 112 could be achieved in one of any number of ways using greater or fewer functional elements. For example, detection logic 202, timing logic 204, and message processing logic 206 could all be implemented in a computer program executed by one or more processors.

The detection logic 202 may comprise a processor, CPU, gate array, logic, discreet circuitry, software, or any combination of hardware and software. The detection logic 202 includes input logic to receive various operator inputs 214 and vehicle sensor inputs 216. For example, the detection logic 202 receives operator inputs from user input devices located at the vehicle and sensor inputs 216 from the sensors located on the vehicle or the cargo. The detection logic 202 may also be connected, via communication link 218, to a MCT if one is located on the vehicle. This connection allows the detection logic 202 to send and receive information using a wireless communication system, typically communicating over a distance of many miles.

In one embodiment, the detection logic 202 operates to execute instructions stored in the memory 208 to perform the functions described herein. The instructions may be stored in the memory 208 during manufacture of the detection system 112. In one embodiment, the instructions are stored on a computer-readable media, such as a floppy disk, hard disk, CDROM, flash memory, or any other type of computer-readable media. The instructions on the computer-readable media may be retrieved and executed by the detection system 112, for example, via the input 214. In one embodiment, the instructions are downloaded from the computer-readable media to the detection system 112 and stored in the memory 208 for later execution. Thus, in one embodiment, the detection system 112 operates to execute instructions stored on a computer-readable media to perform the functions described herein.

The timing logic 204 may comprise a processor, CPU, gate array, logic, discreet circuitry, software, or any combination of hardware and software. The timing logic 204 operates to measure predetermined time periods. The detection logic 202 is coupled to the timing logic 204. The detection logic 202 provides a control signal 220 to the timing logic 204 to control the operation of the timing logic 204. The timing logic 204 provides a completion signal 222 to the detection logic 202 to indicate that a predetermined time period has been completed.

In one embodiment, the control signal 220 includes control information to control the operation of the timing logic 204. For example, the control information operates to clear, preset, reset, activate, suspend, or otherwise control the operation of the timing logic 204. Alternatively, or in addition, the control signal 220 comprises information indicating a length value for the predetermined time period that the timing logic 204 will measure. For example, in one embodiment, a vehicle operator may input a length value for the predetermined time period into the detection logic 202 using the operator input 214. In another embodiment, a length value for the predetermined measurement time period may be stored in the memory 208 and retrieved by the detection logic 202. The detection logic 202 uses the length value to control the timing logic 204, via the control signal 220, to measure a measurement time period equivalent to the length value.

The message processing logic 206 may comprise a processor, CPU, gate array, hardware logic and/or discreet circuitry, software, and/or any combination of hardware and software. The message processing logic 206 is coupled to the detection logic 202 to receive a message control signal 224. The message processing logic 206 operates to generate messages used during operation of the detection system 210. In one embodiment, messages are stored directly in the message processing logic 206. In another embodiment, messages are stored in memory 208 and are sent to the message processing logic 206 via the message control signal 224. In another embodiment, the memory 208 is coupled directly to message processing logic 206 and messages are accessed directly as needed. In another embodiment, the message processing logic 206 assembles specific messages from real-time information sent in the message control signal 224, such as the current time. Thus, the message processing logic 206 may use virtually any combination of stored and real-time information to generate the various messages output from the detection system 112.

During operation of the detection system 112, the detection logic 202 operates to detect that a hazard event has occurred. A hazard event is an event that indicates that the hazardous cargo being transported by the vehicle may create a dangerous risk to people or the environment. In one embodiment, the hazard event is an event that occurs to the vehicle or the hazardous cargo 110 itself. For example, the hazard event may comprise an accident, a vehicle malfunction, or contamination that is detected by one or more vehicle sensors. In another embodiment, the hazard event is based on input from the vehicle operator. For example, the vehicle operator may input an emergency code into the detection logic 202 via the operator input 214 and the emergency code indicates that a hazard event has occurred. In another embodiment, the hazard event is based on input received from a remote location. For example, central station 102 may transmit an emergency code to the vehicle via an MCT located on the vehicle. The MCT relays the emergency code to the detection system 112 via the link 218. In response to the emergency code, the detection logic 202 determines that a hazard event has occurred.

Once the detection system 112 has determined that a hazard event has occurred, the detection system 112 operates to respond by performing one or more response functions. In one embodiment, when a hazard event is detected, the detection system 112 responds by transmitting one or more hazardous material alerts hazardous material alert 228. A hazardous material alert 228 comprises information relating to the hazardous cargo, vehicle, vehicle location, type of hazard event, time, and/or any other relevant information. For example, the detection logic 202 detects a hazard event and outputs a message control signal 222 to the message processing logic 206. The message processing logic 206 processes the received message control signal, and in response, outputs the hazardous material alert 228 that is transmitted by the transmitter 210.

In another embodiment, the detection system 112 responds to a detected hazard event by outputting one or more vehicle messages 226 that are used to control one or more vehicle systems. For example, when the detection logic 202 detects the hazard event, the detection logic 202 outputs a message control signal 224 to the message processing logic 206. The message processing logic 206 processes the received message control signal, and in response, outputs one or more vehicle messages 226. The vehicle messages 226 are processed by vehicle control systems to perform vehicle functions, such as activate an alarm, activate warning lights, activate door locks, or activate a hazard protection system, such as a fire control system.

In another embodiment, the detection system 112 responds to a detected hazard event by outputting one or more status messages that are transmitted to a remote location using a transmitter other than transmitter 210. For example, when the detection logic 202 detects the hazard event, the detection logic 202 may output one or more status messages to the MCT via the link 218 for transmission to central station 102. Thus, it is possible for the detection system 112 to alert personnel at central station 102 when a hazard event occurs.

In one embodiment, central station 102 transmits one or more response messages to the detection system 112 in response to receiving a status message. For example, if the detection system 112 transmits a status message to the central station to inform the central station that a cargo temperature has exceeded a predetermined threshold, the central station may respond with a response message that instructs the detection system 112 to activate one or more vehicle systems or to transmit the hazardous material alert. The received response messages are input to the detection system 112 from the MCT via the link 218.

In one embodiment, the detection system 112 uses the timing logic 204 to measure predetermined time intervals that are used perform various functions. For example, in one embodiment, the detection logic 202 controls the timing logic 204 via the control signal 220 to measure a response time period. In one embodiment, the response time period is used to determine when a hazardous material alert 228 should be transmitted. For example, after a hazard event is detected, a response time period is measured by the timing logic 204, and at the expiration of the response time period, a hazardous material alert 228 is transmitted from the detection system 112. The detection system 112 may use the timing logic 204 to time any type of function, for example, how fast to transmit a hazardous material alert 228, how long to transmit, or to determine when to activate or deactivate one or more vehicle systems.

The detection logic 202 can generally process the sensor inputs 216 at any time to determine whether a hazard condition has occurred. For example, in one embodiment, the detection logic 202 controls the timing logic 204 to measure a measurement time period whose expiration triggers the detection logic 202 to determine a cargo state. For example, the detection logic 202 may control the timing logic 204, via the control signal 220, to measure a one-hour measurement time period. At the expiration of the hour, the timing logic 204 generates the completion signal 222. The completion signal 222 triggers the detection logic 202 to determine the cargo state (i.e., the cargo temperature). The determined cargo state may then be further processed by storing it in memory 208, and/or by comparing it to one or more previous cargo state values stored in the memory 208. Thus, the detection logic 202 may store and track a history of cargo states to determine when cargo state changes occur, and thereby determine a hazard event. For example, a hazard event may occur when the cargo temperature increases by twenty degrees from its initial temperature.

Figure 3:
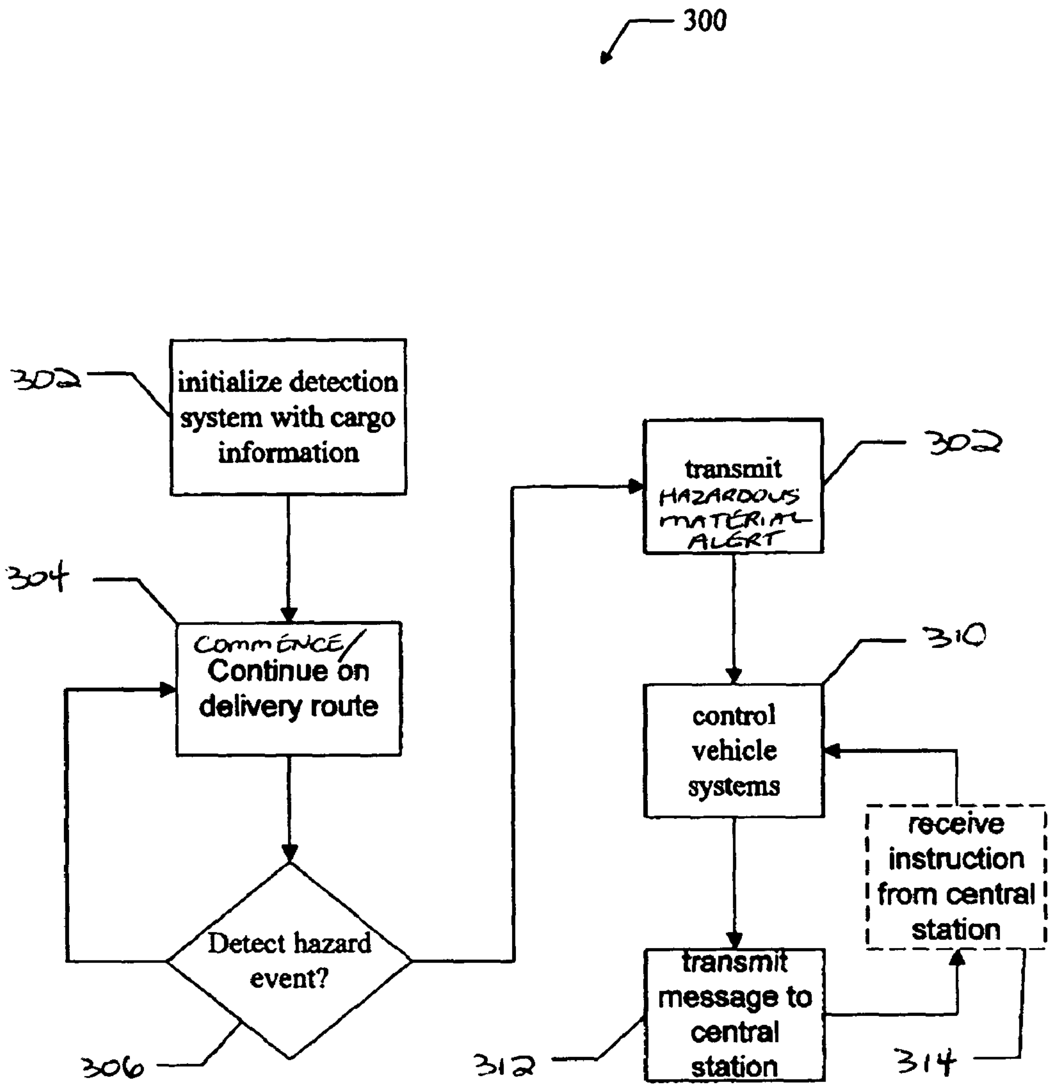
FIG. 3 shows one embodiment of a method for operating a hazard detection system in a vehicle that is transporting hazardous materials.

FIG. 3 shows one embodiment of a method 300 for operating a hazard detection system in a vehicle that is transporting hazardous materials. The method 300 is suitable for use in one or more embodiments of a hazard detection system as described herein. For the following description, it will be assumed that a hazard detection system is installed in a trailer portion of a vehicle that is carrying hazardous cargo to be delivered to one or more delivery sites. For example, the vehicle may be a tractor-trailer truck carrying a hazardous cargo of chemicals to be delivered to one or more locations along a delivery route. Furthermore, it is assumed that the vehicle includes MCT communication logic to communicate. with a central station using a wireless communication channel.

At block 302, the detection system on the vehicle is initialized. For example, information relating to the hazardous material to be transported is stored in memory 208. This information may comprise an identification of the type of hazardous material to be transported, a danger level associated with the hazardous material, containment procedures, temperature/humidity requirements for storage of the hazardous material, treatment procedures, contact information of key personnel associated with the hazardous material and/or its transport, alert information such as the duration of the alert, a repetition rate of the alert, the signal strength of the alert, etc. In some cases, a manifest associated with the hazardous cargo to be transported is used to provide this information. The manifest may contain information about the type of hazardous material, the weight of the material, where the material is being shipped, loading information, storage information, and unloading information, etc.

The initialization information may be downloaded into the detection system 112 via the operator input 214 or any other direct input to the detection system 112. In another embodiment, the information is transmitted to an MCT located on the vehicle and is downloaded into the detection system 112 via the MCT link 218. Once downloaded, the information may be stored in the memory 208.

At block 304, the vehicle commences its delivery route with the hazardous cargo 110 onboard. The vehicle may be a dedicated vehicle with only one scheduled stop, or the vehicle may be scheduled to make multiple stops along a predefined delivery route to deliver portions of the hazardous cargo at each stop.

At block 306, detection system 112 receives a signal indicating that a hazard event has occurred. The hazard event comprises an event which causes the hazardous cargo 110 to become dangerous to the environment or to health (e.g., a chemical spill or radiation leak) and may be generated in response to a vehicle accident, vehicle malfunction, a vehicle operator command, a command received from central station 102, or any other event that causes hazardous cargo 110 to become dangerous. For example, if the vehicle is involved in an accident, an accelerometer may sense a sudden deceleration of the vehicle and send a signal to detection system 112 via sensor input 216 indicative of the event. In another example, if the hazardous cargo 110 must be maintained at a specific temperature, a temperature sensor may monitor the cargo temperature and determine that a hazard event has occurred if the temperature exceeds a predetermined threshold. Virtually any information available to the detection system 112 can be used to determine and/or define a hazard event. If a hazard event is not detected, the method 300 proceeds back to block 304. If a hazard event has occurred, the method 300 proceeds to block 308.

At block 308, a hazardous material alert is transmitted from the detection system in response to the detection of a hazard event. For example, in response to a detected hazard event, the detection logic 202 outputs a message to the message processing logic 206, which in turn, outputs the hazardous material alert 228 for transmission by the transmitter 210. In one embodiment, the information contained in the hazardous material alert 228 is determined by information that was stored in memory 208 during the initialization process (block 302). For example, the information contained in the hazardous material alert may identify the type of hazardous cargo, describe containment procedures, describe treatment procedures, and provide the time/location that the hazard event occurred. Any other relevant information available to the detection system 112 may be contained in the hazardous material alert 228 as well.

In one embodiment, the power level of the hazardous material alert transmitter 210 is controlled by the initialization information. For example, based on the type of hazard event, the hazardous material alert is transmitted by the transmitter 210 at a different power level. Thus, if the cargo is extremely hazardous or the location of the hazard event is remote, the power level of the transmitter 210 may be increased based on information contained in the initialization of the detection system 112.

In another embodiment, the timing of the hazardous material alert message 228 may be controlled. For example, the detection logic 202 controls the timing logic 204 to determine predefined time intervals. These predefined time intervals may be used to control when the alert is activated, duration of the alert, repetition rate of the alert, or any other alert timing parameters.

At block 310, the detection system may optionally operate to control selected vehicle systems in response to the detected hazard event. For example, the detection system 112 may activate a fire control system, secure or open cargo door locks, or activate/deactivate any other vehicle system. In one embodiment, the detection logic 202 of the detection system controls the vehicle systems by outputting messages to the message processing logic 206, which in turn, outputs vehicle messages 226 that are used to control selected vehicle systems. Thus, in response to a detected hazard event, the detection system 112 may operate to control any type of vehicle system.

At block 312, the detection system may optionally operate to send a message to a remote location using a transmitter other than transmitter 210 to inform the remote location about the detected hazard event. For example, the detection logic 202 may send a message via the link 218 to the on-board MCT for transmission to central station 102 via a wireless communication channel. Thus, it is possible for the detection system 112 to inform personnel at central station 102 about the hazard event, the location of the vehicle, or other relevant information.

At block 314, the detection system may optionally receive instructions from a remote location for initiating the hazardous material alert, and/or controlling one or more vehicle systems. For example, the detection system 112 may receive instructions transmitted from central station 102 to an onboard MCT in response to message sent by the MCT. The instructions are input to the detection system 112 via the link 218. The detection logic 202 operates to interpret the instructions and perform the requested function(s). The function(s) may comprise controlling a vehicle system, such as a fire control system, or to initiate and/or alter characteristics associated with the hazardous material alert, for example, by providing additional information to be transmitted in the alert.

Figure 4:
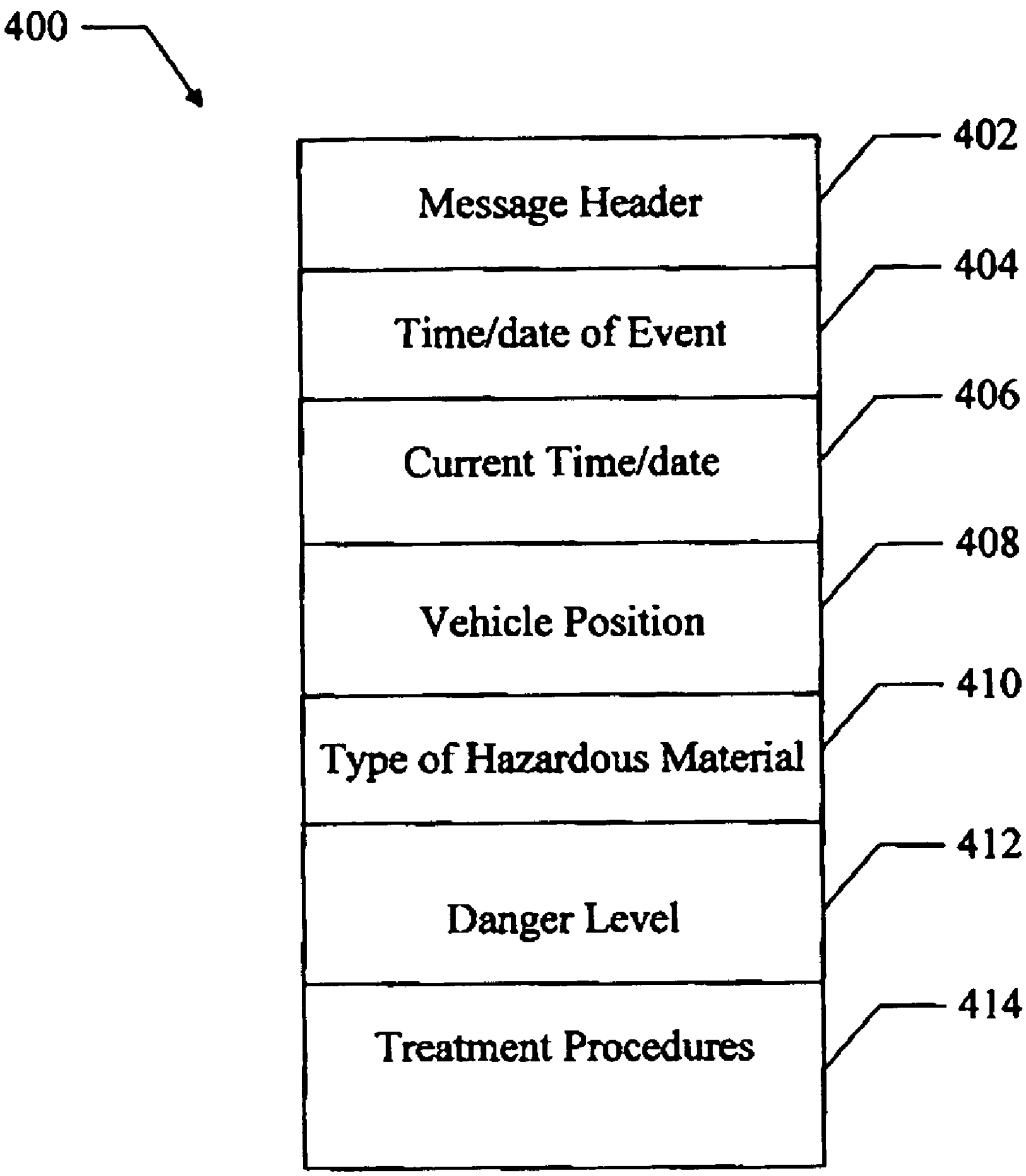
FIG. 4 shows one embodiment of a hazardous material alert for use with the detection system of FIG. 1.

FIG. 4 shows one embodiment of a hazard hazardous material alert message 400 for use with the hazard detection system 112. The hazardous material alert message 400 is transmitted from the detection system 112 in response to a detected hazard event. The hazardous material alert message 400 comprises a message header 402, event time 404, current time 406, vehicle position 408, hazard type 410, danger level indicator 412, and treatment procedures 414. It should be noted that the information shown in the hazardous material alert 400 is only a partial list of the types of information that may be included in the alert. Virtually any type of information available to the detection system 112 may be contained in the hazardous material alert 400.

A hazard detection system for use with a vehicle has been described that operates to provide an hazardous material alert in response to a hazard event. Accordingly, while one or more embodiments of a hazard detection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for providing a hazardous material alert for use with a vehicle that is transporting hazardous material, the method comprising the steps of:
- detecting a hazard event;
- transmitting the hazardous material alert in response to the hazard event, wherein the hazardous material alert comprises information relating to the hazardous material and wherein transmitting the hazardous material alert comprises sending a transmission from the vehicle that can be directly received by emergency personnel responding to the hazard event; and
- receiving a reply transmission at the vehicle in response to transmitting the hazardous material alert, wherein the reply transmission comprises instructions for controlling a system of the vehicle.

2. The method of claim 1, wherein the hazard event is detected from a condition of the vehicle.

3. The method of claim 1, wherein the hazard event is detected from an input received from a vehicle operator.

4. The method of claim 1, wherein the hazard event is detected from a message received from a remote location.

5. The method of claim 1, wherein the hazardous material alert has a range of less than 1000 feet from the vehicle.

6. The method of claim 1, wherein the step of transmitting further comprises a step of transmitting the hazardous material alert using one or more transmitters selected from AM, FM, CB and Police band transmitters.

7. The method of claim 1, further comprising a step of activating one or more additional systems of the vehicle in response to the hazard event.

8. An apparatus for providing a hazardous material alert for use with a vehicle that is transporting hazardous material, the apparatus comprising:

means for detecting a hazard unit;

means for transmitting the hazardous material alert in response to the hazard event, wherein the hazardous material alert comprises information relating to the hazardous material and wherein transmitting the hazardous material alert comprises sending a transmission from the vehicle that can be directed received by emergency personnel responding to the hazard event; and means for receiving a reply transmission at the vehicle in response to transmitting the hazardous material alert, wherein the reply transmission comprises instructions for controlling a system of the vehicle.

9. The apparatus of claim 8, wherein the means for detecting the hazard event comprises means for detecting the hazard event from a condition of the vehicle.

10. The apparatus of claim 8, wherein the means for detecting the hazard event comprises means for detecting the hazard event from a message received from an operator input.

11. The apparatus of claim 8, wherein the means for detecting the hazard event comprises means for detecting the hazard event from a message received from a central station.

12. An apparatus for providing a hazardous material alert for use with a vehicle that is transporting hazardous material, the apparatus comprising:

detection logic for receiving an indication that a hazard event has occurred;

transmission logic coupled to the detection logic, the transmission logic operating to initiate a transmission of the hazardous material alert in response to the hazard event, wherein the hazardous material alert comprises information relating to the hazardous material and wherein the transmission comprises a transmission from the vehicle that can be directly received by emergency personnel responding to the hazard event; and a receiver for receiving a reply transmission at the vehicle in response to initiating the transmission of the hazardous material alert, wherein the reply transmission comprises instructions for controlling a system of the vehicle.

13. The apparatus of claim 12, wherein the detection logic comprises input logic to receive an operator input, and wherein the hazard event is detected from the operator input.

14. The apparatus of claim 12, wherein the detection logic comprises input logic to receive vehicle sensor input, and wherein the hazard event is detected from the vehicle sensor input.

15. The apparatus of claim 12, wherein the detection logic comprises input logic to receive a message from a central station, and wherein the hazard event is detected from the message from the central station.

16. A computer-readable medium comprising instruction for execution by a hazard detection system that is used with a vehicle transporting hazardous material, the instructions, when executed by the hazardous detection system, cause a hazardous material alert to be transmitted, the computer-readable media comprising:

instructions for detecting a hazard event; and instructions for transmitting the hazardous material alert in response to the hazard event, wherein the hazardous material alert comprises information relating to the hazardous material and wherein transmitting the hazardous material alert comprises sending a transmission from the vehicle that can be directly received by emergency personnel responding to the hazard event; and instructions for receiving a reply transmission at the vehicle in response to transmitting the hazardous material alert, wherein the reply transmission comprises instructions for controlling a system of the vehicle.

* * * * *